US010639684B2

(12) United States Patent
Luchia et al.

(10) Patent No.: US 10,639,684 B2
(45) Date of Patent: May 5, 2020

(54) DRAINING AND RINSING CONTAINERS

(71) Applicant: Bourgault Industries Ltd., St. Brieux (CA)

(72) Inventors: Kurt Luchia, St. Brieux (CA); Gerry Miller, St. Brieux (CA); Geoff Bedard, St. Brieux (CA)

(73) Assignee: Bourgault Industries Ltd., St. Brieux (CA)

( * ) Notice: Subject to any disclaimer, the term of this patent is extended or adjusted under 35 U.S.C. 154(b) by 316 days.

(21) Appl. No.: 15/455,657

(22) Filed: Mar. 10, 2017

(65) Prior Publication Data

US 2018/0154407 A1 Jun. 7, 2018

(30) Foreign Application Priority Data

Dec. 6, 2016 (CA) .................................... 2950536

(51) Int. Cl.
*B08B 9/093* (2006.01)
*B67B 7/00* (2006.01)
*B08B 9/08* (2006.01)
*B09B 3/00* (2006.01)

(52) U.S. Cl.
CPC ................ *B08B 9/093* (2013.01); *B08B 9/08* (2013.01); *B09B 3/0058* (2013.01); *B67B 7/38* (2013.01)

(58) Field of Classification Search
None
See application file for complete search history.

(56) References Cited

U.S. PATENT DOCUMENTS 2,002,611 A * 5/1935 Nall .......................... B67B 7/28 141/330
3,069,094 A * 12/1962 Haloski ................... A47L 15/23 134/102.1
4,846,236 A * 7/1989 Deruntz .................... B67B 7/28 141/329
4,961,440 A * 10/1990 Wright .................... B65B 69/00 134/167 R
5,033,348 A * 7/1991 Walsh ....................... B67B 7/38 30/2

(Continued)

FOREIGN PATENT DOCUMENTS

WO WO-9852861 A1 * 11/1998 .............. B67B 7/38

*Primary Examiner* — Cristi J Tate-Sims
(74) *Attorney, Agent, or Firm* — Frost Brown Todd LLC; Nicole Tepe

(57) ABSTRACT

An apparatus for draining a container comprises a vessel with a top opening configured such that the container in an upright orientation can pass downward into the vessel through the top opening. A knife assembly mounted under the top opening has a pointed upper end with right and left blades sloping downward and laterally away from the pointed upper end. The pointed upper end and the blades are configured to cut a flap in a floor of the container when the container is lowered through the top opening and pushed downward against the knife assembly. A push member pushes the flap upward from its remaining attachment along one side thereof as the container is pushed downward. The vessel can be mounted on a stand and include vertical exterior grooves configured to engage corresponding vertical stand members to prevent rotation of the vessel with respect to the stand during use.

15 Claims, 5 Drawing Sheets

(56) References Cited

U.S. PATENT DOCUMENTS

| | | | | | |
|---|---|---|---|---|---|
| 5,174,828 | A | * | 12/1992 | Roth | B67B 7/28<br>134/16 |
| 5,497,813 | A | * | 3/1996 | Dinnis | A01M 7/0085<br>134/115 R |
| 9,216,888 | B2 | | 12/2015 | Eck | |

* cited by examiner

DRAINING AND RINSING CONTAINERS

CROSS-REFERENCE TO RELATED APPLICATION

This application claims priority to and benefit of CA Serial No. 2,950,536, filed Dec. 6, 2016, the contents of which are incorporated by reference in its entirety for all purposes.

FIELD OF THE INVENTION

This disclosure relates to the field of containers, for example such as are used to transport chemicals such as agricultural herbicides, pesticides, fungicides, and the like and in particular an apparatus for draining such containers and mixing the contents with a carrier liquid, typically water, in a sprayer tank or the like.

BACKGROUND

Many different types of material are transported in small hand manipulated containers. For example various chemicals are commonly packaged in plastic containers and poured from the containers into a tank where the chemicals are mixed with water or a like carrier liquid for use. For example agricultural chemicals such as herbicides, pesticides, and fungicides are commonly packaged in 10 liter plastic containers with sealed screw on caps. Typically these chemicals are also at least somewhat hazardous and so the containers must be rinsed thoroughly. A recommended rinsing process includes adding rinse water to the container, agitating same, and then draining the water three times.

This pouring and rinsing process can be quite time consuming, especially where a large number of containers must be drained and rinsed. U.S. Pat. No. 5,174,828 to Roth discloses a system for opening, emptying and rinsing of chemical containers. A knife assembly is mounted inside a vessel under the center of a top opening and the knife is oriented so that a plastic container can be moved in an upright orientation downward so the bottom floor of the container contacts the knife which slices an "X" into the floor to allow the contents to flow out of the container into the vessel.

Later U.S. Pat. No. 9,216,888 to Eck addresses a problem with the Roth device in that liquid flow from the sliced floor of the container is often hindered by sealing contacts between the incised edges of container's newly created cut floor sections and the side surfaces of blades of the Roth knife. Eck adds a sprinkler head under the center of the knife which pushes up on the cut floor sections and pushes them away from the side surfaces of blades to facilitate flow out of the container floor.

BRIEF SUMMARY

The present disclosure provides an apparatus for draining chemical containers that overcomes problems in the prior art.

In a first embodiment, the present disclosure provides an apparatus for draining a container. The apparatus comprises a vessel with a top opening configured such that the container in an upright orientation can pass downward into the vessel through the top opening, and a knife assembly is mounted inside the vessel under the top opening. The knife assembly comprises a substantially vertically oriented pointed upper end, a right blade with a sharpened top edge sloping downward and laterally away in a right direction from the pointed upper end to a right blade end, and a left blade with a sharpened top edge sloping downward and laterally away in a left direction from the pointed upper end to a left blade end located a flap distance from the right blade end. There are flow openings under the top edges of the right and left blades configured allow flow of liquid from one side of each blade to the other side thereof. The pointed upper end and the right and left blades are configured to cut a single flap in a floor of the container, and a push member has a top edge sloping downward from an upper end thereof attached below the pointed upper end to a lower end located between the right and left blade ends. The knife assembly is mounted under the top opening such that the floor of the container passing downward into the vessel contacts the pointed upper end at a first floor location on the floor and as the container moves farther downward the pointed upper end pierces the floor at the first floor location and the right and left blades slice the floor from the first floor location to opposite second and third floor locations forming the flap attached at one edge to the container between the second and third floor locations. As the container moves downward the push member contacts the flap and pushes the flap upward as the right and left blades slice the floor.

In a second embodiment the present disclosure provides an apparatus for draining a container. The apparatus comprises a vessel with a top opening configured such that the container in an upright orientation can pass downward into the vessel through the top opening, and a knife assembly mounted inside the vessel under the top opening and configured to slice a bottom opening in a floor of the container when the container is pushed downward against a pointed upper end of the knife assembly. The vessel includes a plurality of substantially vertical ribs spaced along and extending from a substantially cylindrical interior wall of the vessel, and wherein the vertical ribs correspond to grooves spaced along a substantially cylindrical exterior wall of the vessel. A stand supports the vessel in an upright orientation and includes vertically oriented stand members engaged in the grooves such that the vessel is prevented from rotating with respect to the stand.

In a third embodiment the present disclosure provides an apparatus for draining a container comprising right and left walls extending upward from opposite sides of a floor of the container. The apparatus comprises a vessel with a top opening configured such that the container in an upright orientation can pass downward into the vessel through the top opening. A knife assembly is mounted inside the vessel under the top opening and comprises a blade with a sharpened top edge, a flow opening under the top edge of the blade configured to allow flow of liquid from one side of the blade to the other side thereof, and a push member. The knife assembly is mounted under the top opening such that the container passing downward into the vessel contacts the top edge of the blade and as the container moves farther downward the blade pierces the floor and right and left walls and forms a slice extending from a right wall location across the floor to a left wall location. As the container moves downward the push member contacts the container adjacent to the slice and pushes a first container portion on a first side of the slice away from a second container portion on a second side of the slice.

The present disclosure provides an apparatus for quickly draining containers of chemicals such as herbicides, pesticides, fungicides, and the like into a vessel, and for fast and convenient rinsing of the containers. The apparatus also maintains the vessel in a stable orientation during use, and maintains the lid in a convenient position for opening and closing.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 14 is schematic front view of the knife assembly of the embodiment of

FIG. 13;

DETAILED DESCRIPTION OF THE ILLUSTRATED EMBODIMENTS

Figure 1:
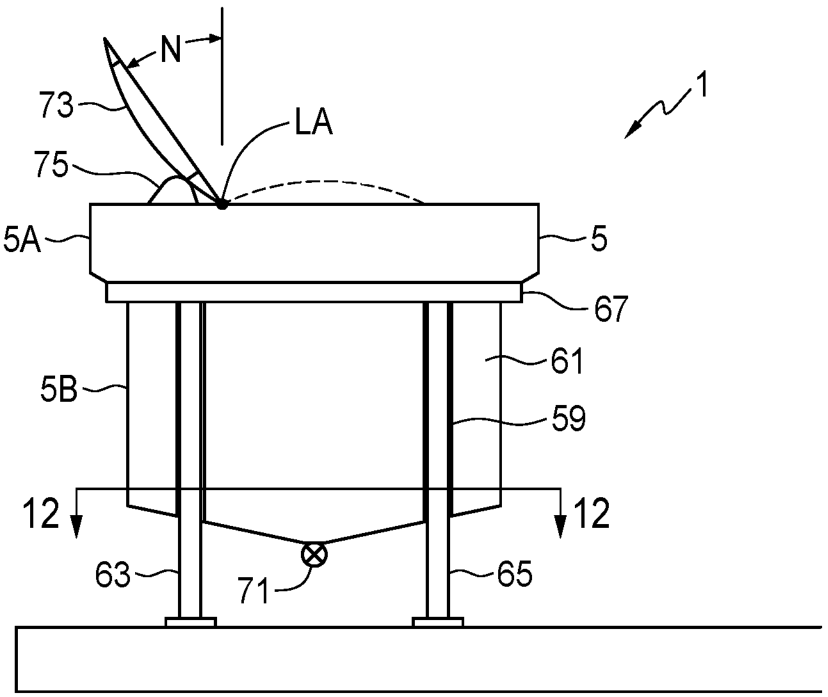
FIG. 1 is a schematic side view of an embodiment of an apparatus of the present disclosure for draining a container.
Figure 2:
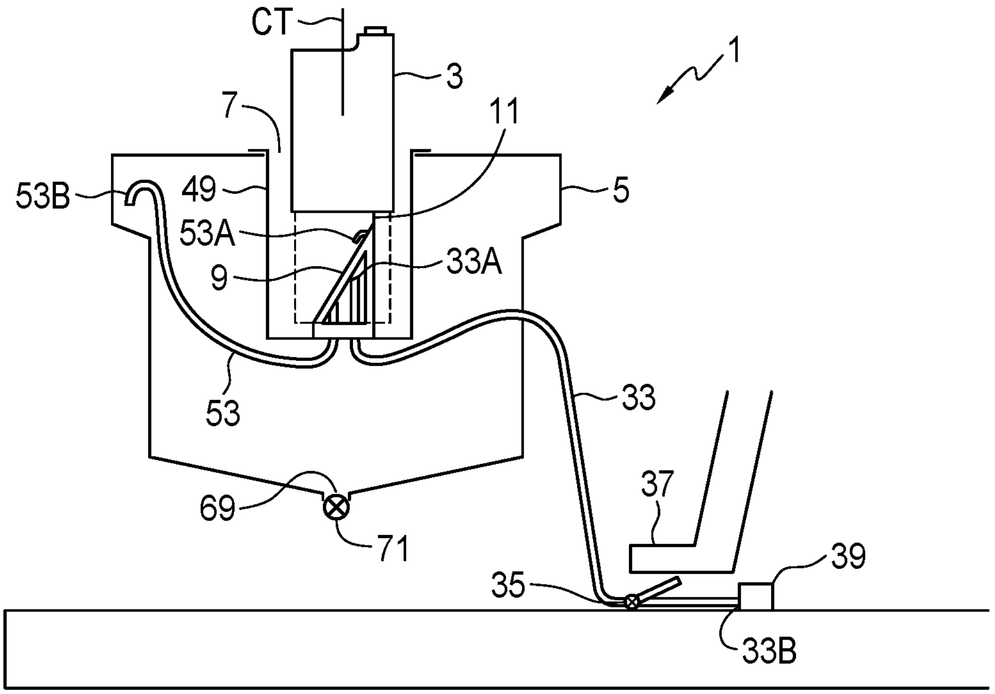
FIG. 2 is a schematic cut-away side view of the embodiment of FIG. 1.

FIGS. 1 and 2 schematically illustrate an embodiment of an apparatus 1 of the present disclosure for draining a container 3. The apparatus 1 comprises a vessel 5 with a top opening 7 configured such that the container 3 in an upright orientation as illustrated in FIG. 2 can pass downward into the vessel 5 through the top opening 7.

A knife assembly 9 is mounted inside the vessel 5 under the top opening 7 and comprises a substantially vertically oriented pointed upper end 11 and, as schematically illustrated further in FIGS. 3-6, right and left blades 13R, 13L. The right blade 13R has a sharpened top edge 15R sloping downward and laterally away in a right direction DR from the pointed upper end 11 to a right blade end 17R and the left blade 13L similarly has a sharpened top edge 15L sloping downward and laterally away in a left direction DL from the pointed upper end 11 to a left blade end 17L located a flap distance FD from the right blade end 17R.

Figure 7:
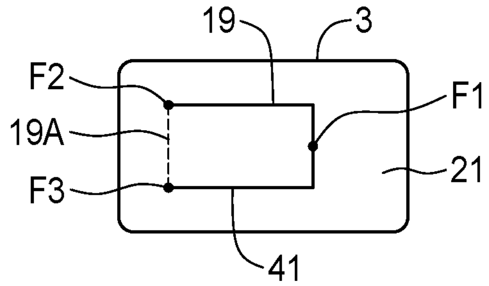
FIG. 7 is a bottom view showing the flap cut into the floor of the container by the knife assembly shown in FIG. 4.
Figure 8:
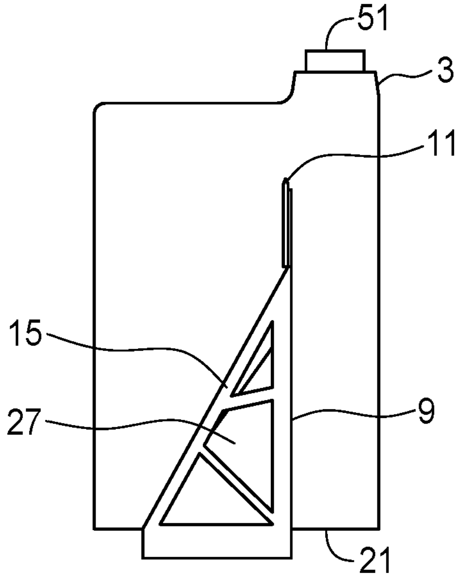
FIG. 8 is a schematic cut-away side view of the container fully lowered onto the knife assembly.
Figure 9:
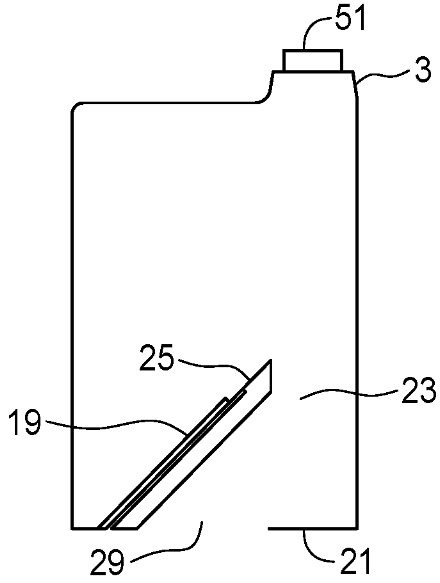
FIG. 9 is a schematic cut-away side view of the container fully lowered onto the knife assembly but showing only the push member of the knife assembly and the flap cut away from the container floor and pushed upward by the push member.

As schematically illustrated in FIGS. 7-9, the pointed upper end 11 and the right and left blades 13R, 13L are configured to cut a single flap 19 in a floor 21 of the container 3, and a push member 23 has a top edge 25 sloping downward from an upper end 25A thereof attached below the pointed upper end 11 to a lower end 25B located between the right and left blade ends 17R, 17L.

The top edges 15R, 15L of the right and left blades 13R, 13L slope at the same angle such that the top edges 15R, 15L are at substantially the same vertical location with respect to the container 3, and the top edge 25 of the push member 23 is below and in proximity to the top edges 15R, 15L of the right and left blades 13R, 13L such that as the container 3 moves downward the push member 23 contacts the flap 19 and pushes the flap 19 upward as the right and left blades 13R, 13L slice the floor 21.

Pushing the flap 19 upward as it is being cut by the blades 13R, 13L allows the liquid to begin flowing out of the container 3 almost as soon as the floor is pierced while the container is moving downward to complete slicing the flap 19, thus hastening the flow of liquid from the container 3.

In the apparatus 1, only two blades 13R, 13L are slicing the container 3 as it is moved downward, reducing the downward force necessary compared to prior art cutting and draining systems which typically have four blades cutting the container at the same time as it is moved downward.

The knife assembly 9 is mounted under the top opening 7 such that the floor 21 of the container 3 passing downward into the vessel 5 contacts the pointed upper end 11 at a first floor location F1 on the floor 21 and as the container 3 moves farther downward the pointed upper end 11 pierces the floor 21 at the first floor location F1 and the right and left blades 13R, 13L slice the floor 21 from the first floor location F1 thereof to opposite second and third floor locations F2, F3 forming the flap 19 attached at one edge 19A to the container 3 between the second and third floor locations F2, F3. As the container 3 moves downward the top edge 25 of the push member 23 contacts the flap 19 and pushes the flap 19 upward as shown in FIG. 9, forming a relatively large bottom opening 29 allowing the contents of the container 3 to flow quickly out of the container 3 through flow openings 27 under the top edges 15 of the blades 13 that are configured allow flow of liquid from one side of each blade 13 to the other side thereof and so into the vessel 5. In FIG. 9 only the push member 23 of the knife assembly 9 is shown for clarity of illustration.

In the illustrated apparatus 1 the pointed upper end 11 is provided by a sharpened vertically oriented spike 31 extending above the sharpened top edges 15 of the blades 13.

As seen in FIG. 2 the illustrated apparatus 1 also includes a rinse tube 33 with a discharge end 33A mounted in the knife assembly 9 under the push member 23 and oriented to direct rinse water into the container 3 through the bottom opening 29 created by pushing the flap 19 upward. An input end 33B of the rinse tube 33 is connected to a rinse valve 35 configured to be activated by an operator to selectively connect the input end 33B to a pressurized water source 39. The rinse valve 35 can be activated by the operator's hand however the illustrated rinse valve 35 is configured to be activated by the operator's foot 37, thus leaving the operator's hands free to maneuver containers 3 and perform other required operations.

The right and left blades 13R, 13L are oriented vertically such that as the container 3 moves downward the blades 13 move upward into slices 41 made in the floor 21 by the sharpened top edges 15 thereof. The top edge 25 of the push member 23 and the top edges 15 of the right and left blades 15R, 15L at the corresponding right and left blade ends 17R, 17L are at substantially the same vertical location such that the flap 19 is fully pushed up.

Figure 3:
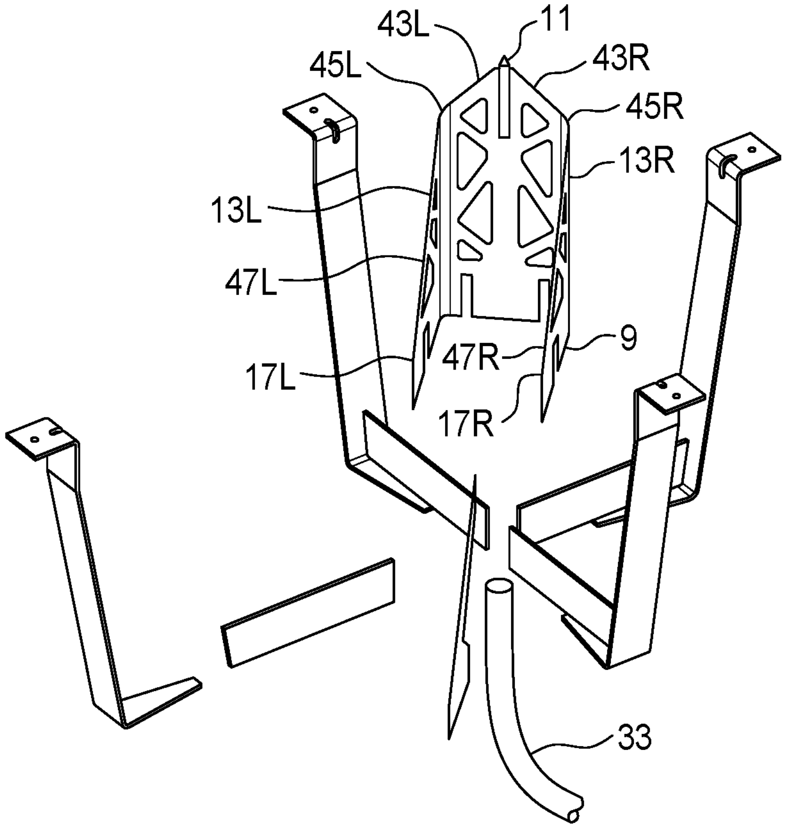
FIG. 3 is a schematic perspective exploded view of the knife assembly and mounting bracket of the embodiment of FIG. 1.
Figure 4:
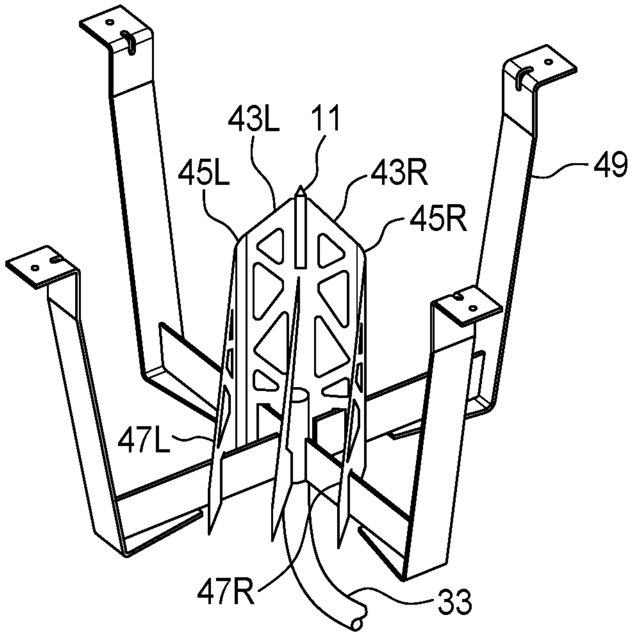
FIG. 4 is a schematic perspective assembled view of the knife assembly and mounting bracket shown in FIG. 3.
Figure 5:
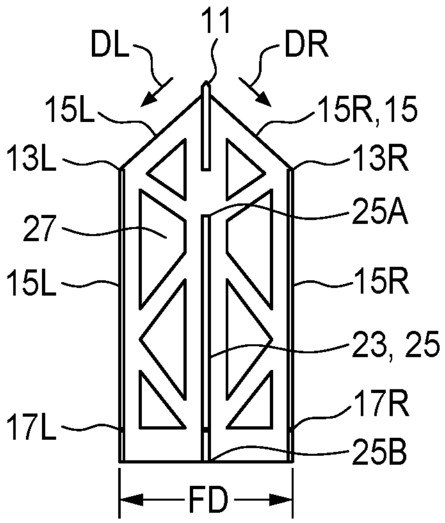
FIG. 5 is a schematic front view of the knife assembly shown in FIG. 4.
Figure 6:
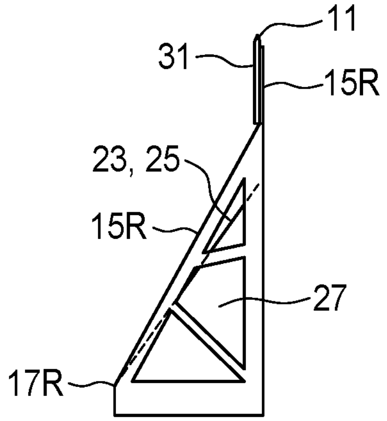
FIG. 6 is a schematic side view of the knife assembly shown in FIG. 4.

In the illustrated knife assembly 9, the right and left blades 13R, 13L comprise right and left first knife sections 43R, 43L sloping downward in opposite directions from the pointed upper end 11 to right and left knife corners 45R, 45L, and right and left second knife sections 47R, 47L sloping downward from the corresponding right and left knife corners 45R, 45L to the corresponding right and left blade ends 17R, 17L; and the right second knife section 47R is parallel to the left second knife section 47L. Also the knife assembly 9 is located such that the pointed upper end 11 is laterally offset with respect to the center CT of the top opening 7. The knife assembly 9 and rinse tube 33 are assembled as shown in FIGS. 3 and 4 attached to a mounting bracket 49 which hangs in the vessel 5 under the top opening 7.

The illustrated blade configuration slices a flap 19 that has the shape of a rectangle attached to the container 3 along a side 19A of the rectangle between the second and third floor locations F2, F3. Offsetting the pointed upper end 11 with respect to the center CT of the top opening 7 allows for a larger bottom opening 29 to be formed in the floor 21.

Figure 10:
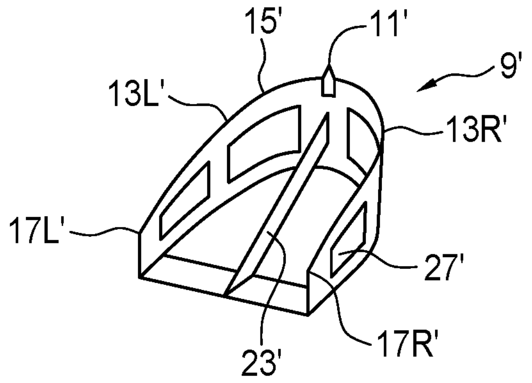
FIG. 10 is a schematic perspective view of an alternate configuration of a knife assembly for use with the embodiment of FIG. 1.
Figure 11:
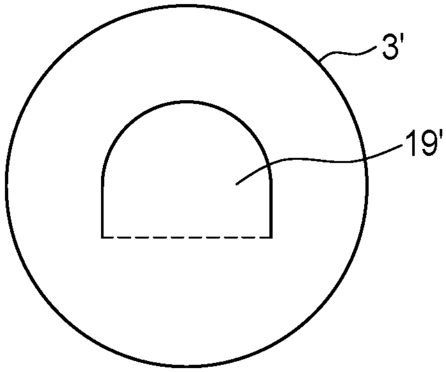
FIG. 11 is a bottom view showing the flap cut into the floor of a cylindrical container by the knife assembly of FIG. 10.

The knife assembly 9 may be configured to cut the flap 19 in virtually any configuration, such as to suit the shape of the container 3 being contemplated for use with the apparatus 1. FIG. 10 for example shows an alternate knife assembly 9' where the right and left blades 13R', 13L' curve outward and downward from the pointed upper end 11' to the corresponding right and left blade ends 17R', 17L' such that the flap 19' pushed up by the push member 23' has curved sides as seen in FIG. 11. Flow openings 27' under the top edges 15' of the blades 13' allow liquid to flow out of the container 3'. It is contemplated that the knife assembly may be configured in other shapes to suit a particular circumstance.

As is known in the prior art the cap 51 of container 3 is left in place to seal the container 3 as the knife assembly pierces the floor of the container 3. FIG. 2 also schematically illustrates a snorkel tube 53 with an open inside end 53A attached to the knife assembly below the pointed upper end 11 and an open outside end 53B located in an upper portion of the vessel 5. The snorkel tube 53 allows air to flow from the upper portion of the vessel 5, which is open to the atmosphere, into the top of the container 3 while the liquid contents is draining out of the container 3, thus further facilitating flow out of the container 3.

Figure 12:
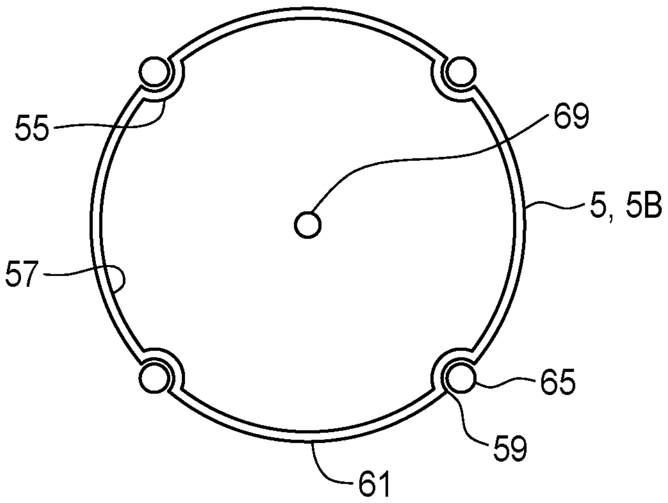
FIG. 12 is a schematic sectional view along line 12-12 in FIG. 1.

As schematically illustrated in FIG. 12 the vessel 5 includes a plurality of substantially vertical ribs 55 spaced along and extending from a cylindrical interior wall 57 of the vessel 5. As liquid is typically swirling around the inside of the vessel 5 during operations these ribs 55 break up the smooth flow around the interior wall 57 and increasing agitation and mixing action.

Conveniently the vertical ribs 55 correspond to grooves 59 spaced along a cylindrical exterior wall 61 of the vessel 5, typically conveniently accomplished by providing a mold with the ribs 55 formed therein and rotationally molding plastic in the mold. The vessel 5 is mounted on a stand 63 with vertical stand members 65 engaged in the grooves 59 such that the vessel 5 is prevented from rotating with respect to the stand 63 which can disrupt the orientation of the various conduits typically connected to the vessel 5.

The stand 63 comprises a substantially circular stand ring 67 attached to top ends of the vertical stand members 65. The vessel 5 comprises a cylindrical upper portion 5A extending over the stand ring 67 and supported on the stand ring 67, while a cylindrical lower portion 5B is located between the vertical stand members 65.

As seen in FIG. 2 all inner surfaces of the vessel 5 slope to a bottom drain port 69, and a drain valve 71 is operative to selectively open and close the drain port 69.

In the illustrated apparatus 1 a lid 73 is pivotally attached to the container 5 about a lid pivot axis LA and is movable from a closed position sealing the top opening 7 as shown in phantom lines in FIG. 1, to an open position shown in FIG. 1 where the lid rests against a support member 75, typically molded into the top of the vessel 5, such that the lid 73 is supported at an angle N of between 30 and 55 degrees down from a vertical orientation where same is more convenient for closing. It is contemplated that the lid 73 may be rotatably mounted to an arm that is pivotally attached at the lid pivot axis LA, and where the lid 73 is then rotated to engage lugs or the like around the top opening 7 to secure the lid 73 in the closed position. Such rotational force on the lid 73 tends to rotate the vessel 5 however in the illustrated apparatus such rotation is prevented by the stand members 65 engaged in the grooves 59.

Figure 13:
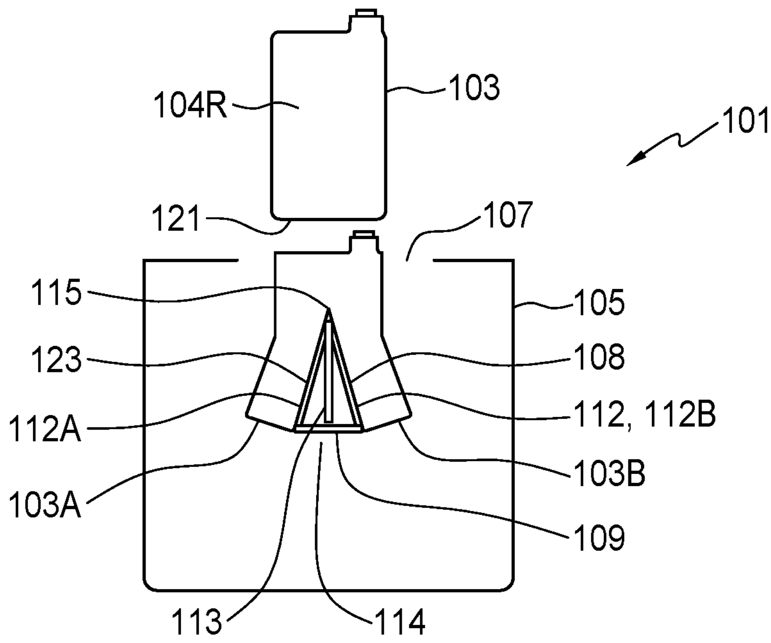
FIG. 13 is a schematic sectional side view of an alternate embodiment of an apparatus of the present disclosure for draining a container.
Figure 14:
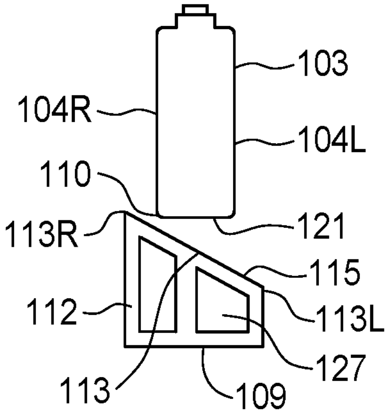
Figure 15:
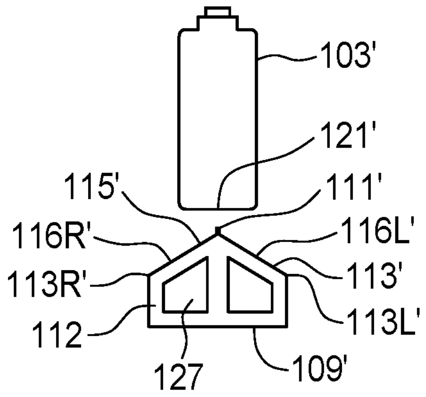
FIG. 15 is a schematic front view of an alternate knife assembly for use with the embodiment of FIG. 13.

FIGS. 13-15 schematically illustrate an alternate apparatus 101 for draining a container 103 where the floor and side walls of the container 103 are sliced and spread apart. The container 103 comprises right and left walls 104R, 104L extending upward from opposite sides of a floor 121 of the container 103. The apparatus 1 comprises a vessel 105 with a top opening 107 configured such that the container 103 in an upright orientation can pass downward into the vessel 105 through the top opening 107.

Figure 16:
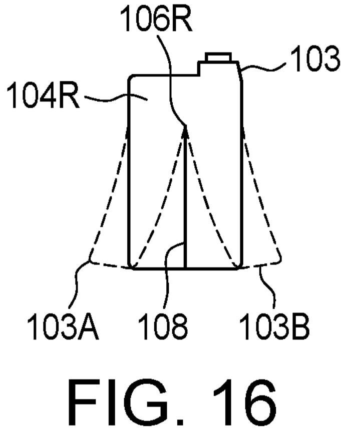
FIG. 16 is a schematic side view of the slice in a container sliced by the knife assembly of FIG. 14, with the first and second container portions spread apart to form a gap.
Figure 17:
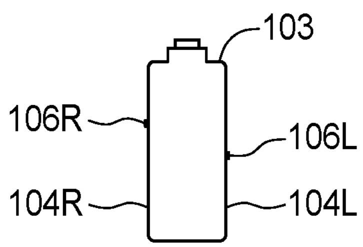
FIG. 17 is a schematic front view of the sliced container of FIG. 16.

A knife assembly 109 is mounted inside the vessel 105 under the top opening 107 and comprises a blade 113 with a sharpened top edge 115. Flow openings 127 under the top edge 115 of the blade 113 are configured to allow flow of liquid from one side of the blade 115 to the other side thereof. The knife assembly 109 is mounted under the top opening 107 such that the container 103 passing downward into the vessel 105 contacts the top edge 115 of the blade 113 and as the container 103 moves farther downward the blade 113 pierces the floor 121 and right and left walls 104R, 104L and forms a slice 108 as shown in FIGS. 16 and 17, extending from a right wall location 106R across the floor 121 to a left wall location 106L. As the container 103 moves downward a push member 123 contacts the container 103 adjacent to the slice 108 and pushes a first container portion 103A on a first side of the slice 108 away from a second container portion 103B on a second side of the slice 108 as illustrated in FIG. 13 and by the dotted lines in FIG. 16 allowing liquid to flow out through a gap 114 created between the first and second container portions 103A, 103B.

FIG. 14 schematically illustrates the blade 113 where the top edge 115 of the blade 113 slopes downward from a right end 113R thereof to an opposite left end 113L thereof and where the knife assembly 109 is mounted under the top opening such that as the container 103 passes downward into the vessel a bottom corner 110 of the container, where the floor 121 meets the right wall 104R, contacts a right portion of the top edge 115 of the blade 113 and as the container 103 moves farther downward the top edge 115 of the blade 113 pierces the floor 121 and right wall 104R and forms the slice 108 up the right wall 104R, across the floor 121, and up the left wall 104L.

The push member 123 comprises a spreader plate 112 sloping downward and outward from the sharpened top edge 115 of the blade 113, and where the flow openings 127 are also configured to allow flow of liquid from one side of the spreader plate 112 to the other side thereof. The illustrated push member 123 comprises first and second spreader plates 112A, 112B sloping downward and outward from opposite sides of the sharpened top edge 115 of the blade 113, and the flow openings 127 are configured to allow flow of liquid through the spreader plates 112, and out the gap 114.

FIG. 15 schematically illustrates a knife assembly 109' with an alternate configuration of the blade 113' comprising a substantially vertically oriented pointed spike 111' extending upward from a middle portion of the blade 113' and wherein the top edge 115' of a right portion 116R' of the blade 113' slopes downward from the spike 111' to a right end 113R' of the blade 113' and the top edge 115' of a left portion 116L' the blade 113' slopes downward from the spike 111' to a left end 113L' of the blade 113'.

With this configuration of the blade 113' the initial force on the container 103' when contacting the blade 113' is in a middle portion of the floor 121' thereof, and the blade 113' then forms the slice 108 in each direction from there. It is contemplated that with this configuration of the knife 113', the container 103 will be more readily pierced as same will not tend to simply slide down the sloping blade as will tend to happen with the blade 113.

With either blade 113 or 113', the spreader plates 112 extend downward and outward from the top edge of the blade to create the gap 114 in the sliced container, and define large flow openings 127 to allow liquid to flow quickly out of the container through the gap 114.

The present disclosure provides an apparatus 1 for fast draining of a container 3 into a vessel 5, and for convenient rinsing of the container 3. The apparatus 1 also is configured to maintain the vessel 5 in a stable orientation during use, and to maintain the lid 73 in a convenient position for opening and closing.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An apparatus for draining a container, the apparatus comprising:

a vessel with a top opening configured such that the container in an upright orientation can pass downward into the vessel through the top opening;

a knife assembly mounted inside the vessel under the top opening, the knife assembly consisting of a right blade, a left blade, and a substantially vertically oriented pointed upper end such that the knife assembly is configured to cut a single flap in a floor of the container;

wherein the right blade has a sharpened top edge sloping downward and laterally away in a right direction from the pointed upper end to a right blade end;

wherein the left blade has a sharpened top edge sloping downward and laterally away in a left direction from the pointed upper end to a left blade end located a distance from the right blade end;

flow openings are defined under the top edges of the right and left blades configured allow flow of liquid from one side of each blade to the other side thereof; and a push member having a top edge sloping downward from an upper end thereof attached below the pointed upper end to a lower end located between the right and left blade ends;

wherein the knife assembly is mounted under the top opening such that the floor of the container passing downward into the vessel contacts the pointed upper end at a first floor location on the floor and as the container moves farther downward the pointed upper end pierces the floor at the first floor location and the right and left blades slice the floor from the first floor location to opposite laterally spaced second and third floor locations forming the single flap attached at one edge to the container between the second and third floor locations; and wherein as the container moves downward the push member contacts the flap and pushes the flap upward as the right and left blades slice the floor.

2. The apparatus of claim 1 wherein the pointed upper end is provided by a sharpened vertically oriented spike extending above the sharpened top edges of the right and left blades.

3. The apparatus of claim 1 comprising a rinse tube with a discharge end mounted in the knife assembly under the push member and oriented to direct rinse water into the container through a bottom opening created by pushing the flap upward, and an input end connected to a rinse valve configured to be activated by an operator's foot to selectively connect the input end to a pressurized water source.

4. The apparatus of claim 1 wherein the right and left blades are oriented vertically such that as the container moves downward the blades move upward into slices made in the floor by the sharpened top edges thereof.

5. The apparatus of claim 4 wherein the top edges of the right and left blades slope at the same angle such that the top edges of the right and left blades are at substantially the same vertical location with respect to the container as it moves downward, and wherein the top edge of the push member is below and in proximity to the top edges of the right and left blades.

6. The apparatus of claim 1 wherein the right and left blades comprise right and left first knife sections sloping downward in opposite directions from the pointed upper end to right and left knife corners, and right and left second knife sections sloping downward from the corresponding right and left knife corners to the corresponding right and left blade ends; and wherein the right second knife section is substantially parallel to the left second knife section.

7. The apparatus of claim 6 wherein the knife assembly is located such that the pointed upper end is laterally offset with respect to a center of the top opening, and such that the flap has substantially the shape of a rectangle attached to the container along a side of the rectangle between the second and third floor locations.

8. The apparatus of claim 6 wherein the top edge of the push member and the top edges of the right and left blades at the corresponding right and left blade ends are at substantially the same vertical location.

9. The apparatus of claim 1 wherein the right and left blades curve outward and downward from the pointed upper end to the corresponding right and left blade ends such that the flap has curved sides.

10. The apparatus of claim 1 comprising a snorkel tube with an open inside end attached to the knife assembly below the pointed upper end and an open outside end located in an upper portion of the vessel.

11. The apparatus of claim 1 wherein the vessel includes a plurality of substantially vertical ribs spaced along and extending from a substantially cylindrical interior wall of the vessel.

12. The apparatus of claim 11 wherein the vertical ribs correspond to grooves spaced along a substantially cylindrical exterior wall of the vessel, and wherein the vessel is mounted on a stand with vertical stand members engaged in the grooves such that the vessel is prevented from rotating with respect to the stand.

13. The apparatus of claim 12 wherein the stand comprises a substantially circular stand ring attached to top ends of the vertical stand members, and the vessel comprises a substantially cylindrical lower portion located between the vertical stand members and an upper portion extending over the stand ring and supported on the stand ring.

14. The apparatus of claim 1 wherein all inner surfaces of the vessel slope to a bottom drain port, and comprising a drain valve operative to selectively open and close the drain port.

15. The apparatus of claim 1 comprising a lid pivotally attached to the container and movable from a closed position sealing the top opening to an open position supported at an angle of between 30 and 55 degrees down from a vertical orientation.

* * * * *

UNITED STATES PATENT AND TRADEMARK OFFICE

CERTIFICATE OF CORRECTION

PATENT NO. : 10,639,684 B2
APPLICATION NO. : 15/455657
DATED : May 5, 2020
INVENTOR(S) : Kurt Luchia et al.

It is certified that error appears in the above-identified patent and that said Letters Patent is hereby corrected as shown below:

In the Claims

Column 8, Line 4, reads "and left blades configured allow flow of liquid ..." which should be deleted and replaced with "and left blades configured to allow flow of liquid ..."

Signed and Sealed this
Tenth Day of November, 2020

Andrei Iancu
*Director of the United States Patent and Trademark Office*